(12) United States Patent
LeFlohic et al.

(10) Patent No.: US 11,244,353 B2
(45) Date of Patent: Feb. 8, 2022

(54) DYNAMIC BROADCAST LINEUPS BASED ON LOCAL AND THIRD-PARTY DATA SOURCES

(71) Applicant: Jelli, Inc., San Mateo, CA (US)

(72) Inventors: John Paul LeFlohic, San Mateo, CA (US); Torsten Schulz, Palo Alto, CA (US); Stephen King Dougherty, San Francisco, CA (US)

(73) Assignee: Jelli, Inc., San Mateo, CA (US)

( * ) Notice: Subject to any disclaimer, the term of this patent is extended or adjusted under 35 U.S.C. 154(b) by 0 days.

(21) Appl. No.: 17/026,828

(22) Filed: Sep. 21, 2020

(65) Prior Publication Data

US 2021/0097576 A1 Apr. 1, 2021

Related U.S. Application Data

(63) Continuation of application No. 15/130,830, filed on Apr. 15, 2016, now Pat. No. 10,832,288.

(60) Provisional application No. 62/148,572, filed on Apr. 16, 2015.

(51) Int. Cl.
*G06Q 30/02* (2012.01)

(52) U.S. Cl.
CPC ..... *G06Q 30/0264* (2013.01); *G06Q 30/0243* (2013.01); *G06Q 30/0244* (2013.01); *G06Q 30/0246* (2013.01)

(58) Field of Classification Search
USPC ........................................................ 705/14.1
See application file for complete search history.

(56) References Cited

U.S. PATENT DOCUMENTS

| | | |
|---|---|---|
| 2005/0267803 A1 | 12/2005 | Patel |
| 2007/0073583 A1 | 3/2007 | Grouf |
| 2007/0130009 A1 | 6/2007 | Steelberg |
| 2007/0162926 A1 | 7/2007 | Steelberg |
| 2009/0313120 A1 | 12/2009 | Ketchum |
| 2012/0166289 A1 | 6/2012 | Gadoury |

*Primary Examiner* — Afaf Osman Bilal Ahmed
(74) *Attorney, Agent, or Firm* — Van Pelt, Yi & James LLP

(57) ABSTRACT

Inventory data is stored, wherein the inventory data represents for each of a plurality of broadcast stations a corresponding inventory of audio advertising spots available from that broadcast station to be filled by an advertising placement system. An advertising campaign data representing a set of advertising objectives of an advertising campaign is received. The inventory data is used to iteratively select advertising spots to be associated with the advertising campaign, based at least in part on a respective computed fitness of match between each selected advertising spot and said advertising objectives.

20 Claims, 9 Drawing Sheets

DYNAMIC BROADCAST LINEUPS BASED ON LOCAL AND THIRD-PARTY DATA SOURCES

CROSS REFERENCE TO OTHER APPLICATIONS

This application is a continuation of U.S. patent application Ser. No. 15/130,830 entitled DYNAMIC BROADCAST LINEUPS BASED ON LOCAL AND THIRD-PARTY DATA SOURCES filed Apr. 15, 2016, which claims priority to U.S. Provisional Patent Application No. 62/148,572 entitled DYNAMIC BROADCAST LINEUPS BASED ON LOCAL AND THIRD-PARTY DATA SOURCES filed Apr. 16, 2015, both of which are incorporated herein by reference for all purposes.

BACKGROUND OF THE INVENTION

Broadcast networks such as those in radio and television offer advertising spots to finance operations. The matching of advertising spots to advertisements in a broadcast network differs from the matching in other media, such as online advertising, at least in part because of the nature of planning broadcast schedules in advance and the one-way one-to-many nature of a broadcast network. Arranging lineups of advertising spots in broadcast networks is currently a complex and manual process that does not necessarily maximize benefit to either advertiser or broadcaster.

BRIEF DESCRIPTION OF THE DRAWINGS

Various embodiments of the invention are disclosed in the following detailed description and the accompanying drawings.

DETAILED DESCRIPTION

Figure 1:
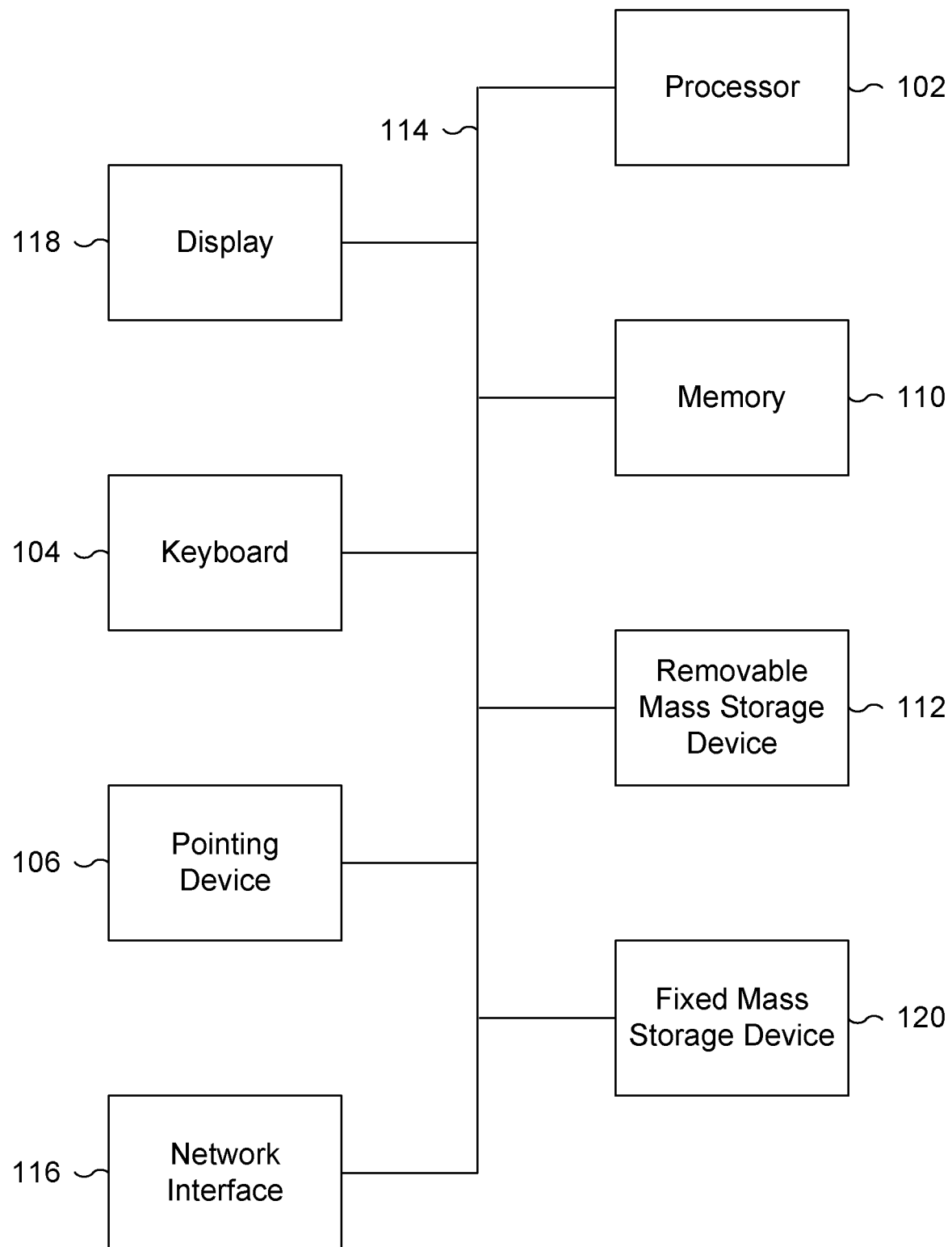
FIG. 1 is a functional diagram illustrating a programmed computer system for broadcast advertising in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Any person having ordinary skill in the art will recognize that while certain examples are given throughout this specification for radio broadcast networks and/or stations and corresponding audio media, without loss of generality the same principles and disclosed techniques may be applied to television broadcast networks and/or stations and corresponding video media. Without loss of generality throughout this specification "broadcasting" refers generally to the distribution of audio, video, and/or multimedia content in a one-to-many model via any electronic mass communications medium or combination of media including electromagnetic spectrum, over the air/terrestrial media, cable/coaxial/wired media, satellite transmission media, and/or computer readable media. Broadcasting may also refer to print broadcasting.

Thus, throughout this specification, "media" may refer to any form of information transmission, for example radio, television, other communication using electromagnetic waves, cable, and/or computer transmissions. Throughout this specification, "users" refer to any consumers of the content, including listeners and viewers of the content. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, broadcast over twisted pair cable, and broadcast via dynamic billboards or signs.

Any person having ordinary skill in the art will recognize that while certain examples are given throughout this specification for radio broadcast networks and/or stations and corresponding audio media, without loss of generality the same principles and disclosed techniques may be applied to television broadcast networks and/or stations and corresponding video media. Without loss of generality throughout this specification "broadcasting" refers generally to the distribution of audio, video, and/or multimedia content in a one-to-many model via any electronic mass communications medium or combination of media including electromagnetic spectrum, over the air/terrestrial media, cable/ coaxial/wired media, satellite transmission media, and/or computer readable media. Broadcasting may also refer to print broadcasting.

Thus, throughout this specification, "media" may refer to any form of information transmission, for example radio, television, other communication using electromagnetic waves, cable, and/or computer transmissions. Throughout this specification, "users" refer to any consumers of the content, including listeners and viewers of the content. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, broadcast over twisted pair cable, and broadcast via dynamic billboards or signs.

The example of radio is given now, but these principles may be applied for example to television similarly.

FIG. 1 is a functional diagram illustrating a programmed computer system for broadcast advertising in accordance with some embodiments. As shown, FIG. 1 provides a functional diagram of a general purpose computer system programmed to execute broadcast advertising in accordance with some embodiments. As will be apparent, other computer system architectures and configurations can be used to execute broadcast advertising. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard-disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
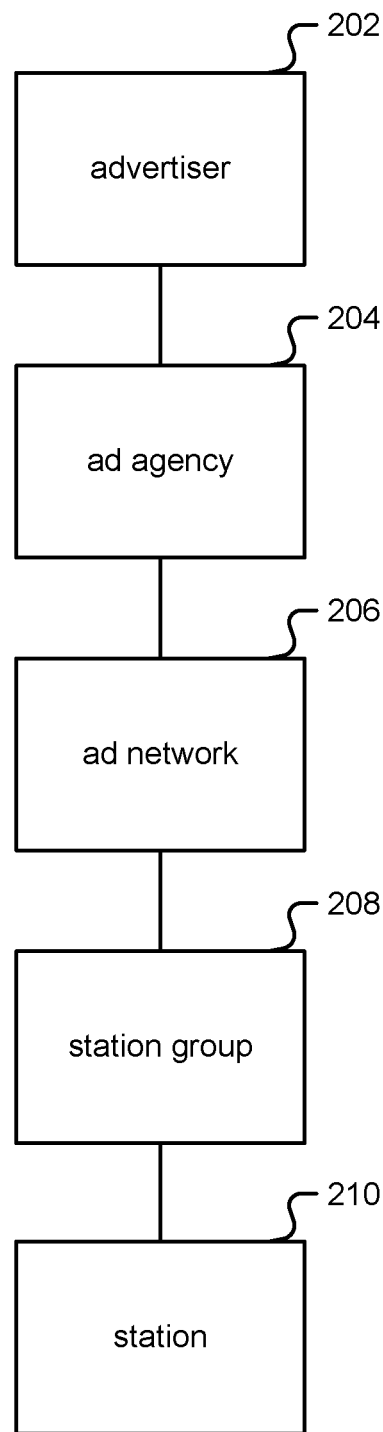
FIG. 2 is a hierarchical diagram illustrating example parties involved in the creation and placement of an ad for broadcast.

Advertising and Broadcast. FIG. 2 is a hierarchical diagram illustrating example parties involved in the creation and placement of an ad for broadcast. A national Advertiser 202 has one or more products, services, and/or messages as advertising on broadcast media. Advertiser 202 retains an ad agency 204 to develop the ad campaign. For the purposes of this specification the ad campaign may be a national campaign or a regional campaign. An ad campaign may include one or more Request For Proposal ("RFP") specifications. An RFP specification may include targeting information, including demographics, markets, market characteristics, weeks, and periods of each week. An RFP specification may also include sizing specifications, including a flexible combination of budget limit, impressions goal, or impressions per price rate limiters. Impressions and/or impacts are a measure of the audience of a station when an ad is broadcast, and are statistically determined by companies such as Arbitron/Nielsen via diary or automated listeners, for example by the hour. An RFP may request impressions in terms of Gross Ratings Points ("GRP"s) in a specific demographic wherein 1 GRP is 1% of the national population within the specific demographic. For example if an ad campaign requests 2 GRPs for women aged 18-45, and it is determined that 65 million women are aged 18-45 nationally, then the ad campaign requests 2% of 65 million or 1.3 million impressions within that demographic.

The ad campaign also comprises one or more ad-creative assets, for example audio creative suitable for a radio ad, video creative suitable for television, and online creative suitable for internet distribution. In some embodiments, advertiser 202 comprises an internal ad agency team 204 within the same corporation.

Ad agency 204 then retains an ad network 206 for publication and/or distribution of the ad campaign. An ad network 206 manages a portion of the placement spots available on multiple broadcast stations 210. Each broadcast station 210 may be independent of the ad network 206 or may be part of the ad network 206. The ad network 206's inventory is the collection of placement spots available on the broadcast media of each broadcast station 210. As will be further elaborated, each spot comprises a position, for example a day of week and/or a daypart (for example, 'AM Drivetime', 'lunch', 'PM Drivetime', or 'evening'). Ad network 206's inventory may be acquired based on direct affiliation with specific broadcast stations 210 and/or may be acquired based on affiliation with station groups 208 comprising multiple broadcast stations 210.

The Ad Network. Radio stations typically have relatively fixed ad breaks, typically twice per hour. A full break might be 5 minutes long, with 4 minutes of advertising. Stations 210 attempt to fill most of each ad break with local advertisers as these tend to pay substantially more to the station 210 than national-product advertising by advertisers 202. However, stations 210 usually do not have enough demand to fully fill the ad-placement spots they have. These ad spots are thus called a station's inventory. The station 210 will thus contract out a portion of their inventory to an ad network 206. The ad network 206 mediates between a large group of stations 208, 210 and national advertisers 202. An ad network 206 may be necessary because the logistical overhead of advertisers 202 interacting directly with stations 210 would be prohibitive for both stations 210 and advertisers 202.

Figure 3A:
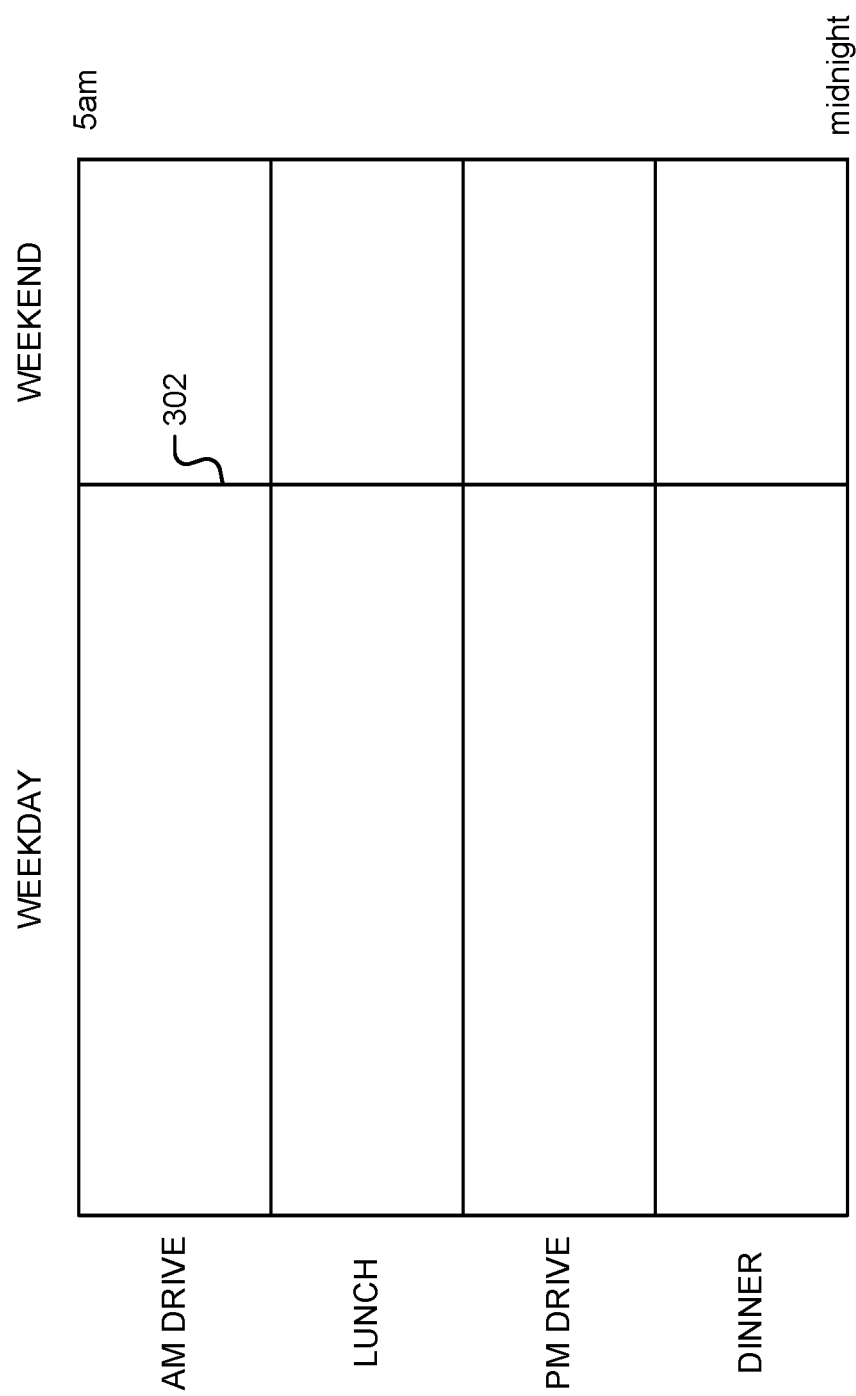
FIG. 3A is an illustration depicting radio broadcast dayparts.

Station Inventory. FIG. 3A is an illustration depicting radio broadcast dayparts. In a radio embodiment, the station 210 typically provides the ad network 206 with inventory for each week, for example twenty-eight pieces of inventory. Each of the seven days of the week has an inventory for four typical dayparts: AM Drive (referring to the morning drive time to work for commuters), Midday, PM Drive (also known as afternoon drive time), and Evening. An inventory is specified by giving the part of the week it covers called a "daypart" 302, the number of ad breaks it contains and the seconds duration each break is to last.

For example, an inventory might cover the "Monday 5a-10a" daypart (referring to 5 am to 10 am on Monday), and contain two 60-second breaks. This would indicate that the station agrees to play one minute of the network's ad content (an "ad break" from the network's perspective) at two points during the daypart Monday 5a-10a. However, the station 210 does not explicitly state when they will play the breaks, only that they will not play them too close together, for example within 25 minutes of each other. The coarseness of the contract allows the station 210 to retain some flexibility with where it places its network ads, while still allowing the network 206 to place advertisers' ads into the part of the day they desire.

Figure 3B:
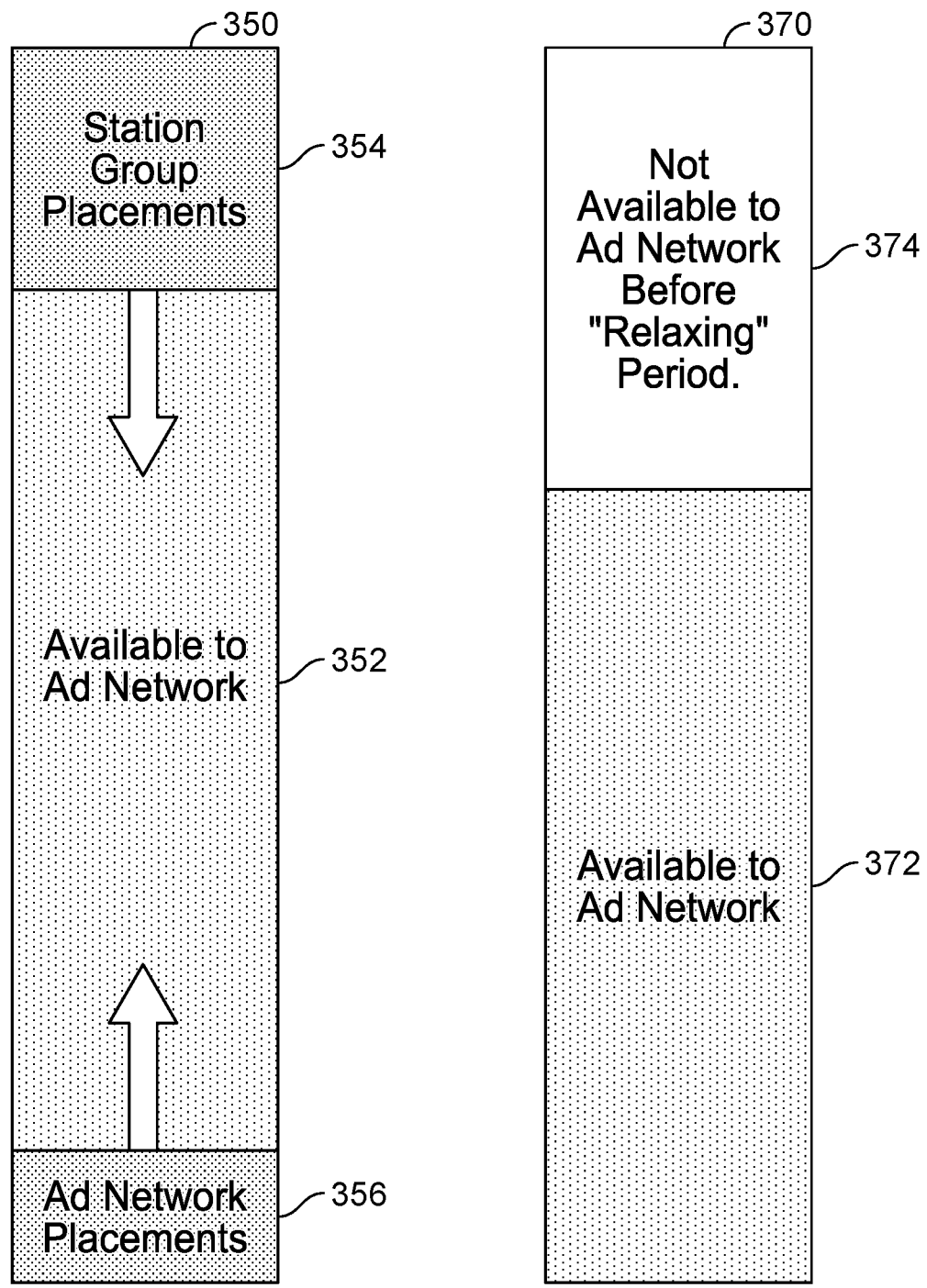
FIG. 3B are illustrations depicting dynamic inventory.

Dynamic Station Inventory. FIG. 3B are illustrations depicting dynamic inventory. Dynamic inventory refers to an inventory/supply that may change over time as third party ad network 210, for example ones using traditional placement, remove or put back inventory into a total inventory.

In one embodiment, a "meets in the middle" dynamic inventory is used: a third-party ad network and/or station group has a total station inventory/station group inventory 350 that it makes completely available to an ad network 210 using disclosed techniques for advertising placement. The third-party ad network and/or station group placements 354 reduce total inventory 350 just as the ad network 210 placements 356 reduce total inventory. In this embodiment little or no ads are reserved at the beginning of a placement cycle to the third-party ad network and/or station group. At a point, for example two weeks before a broadcast time, the remaining inventory available to the ad network 352 is split between the two groups to "meet in the middle" whether the middle refers to a straight 50% split of total inventory 350, remaining inventory 352, or any other threshold/dynamically calculated multiple besides 50%.

In an alternate embodiment, a "relaxing" dynamic inventory is used: a third-party ad network and/or station group has a total station inventory/station group inventory 370 that it makes a percentage available 372 to an ad network 210 using disclosed techniques for advertising placement. The remaining percentage is not made available to ad network 210 in an effort for internal/other sales. At a period of "relaxing", for example two weeks before a broadcast time, the remaining inventory 374 not consumed by placements is released to the ad network 210 and may be split between the two groups using a similar split as the "meets in the middle" dynamic inventory.

A Single Campaign. A broadcast network 206 may represent inventory from hundreds or thousands of stations 210. When an advertiser 202 approaches them about running an ad campaign, the advertiser 202 may specify directly or indirectly what demographic, for example Women 18-49 or w18-49, and daypart they would like to play in and how many impressions they would like to get. The advertiser may specify a wide daypart such as Monday-Friday 5a-10a; that is, a daypart does not need to be on a single day. The daypart can also be complex, specifying several parts of the week: "Monday-Friday 5a-10a; Monday-Friday 3p-8p". The network 206 then determines how large a campaign they can sell the advertiser 202 and presents the plan to them as a proposal. If the advertiser approves, the plan becomes booked.

In one embodiment, a campaign plan moves between four business-process states: saved, proposed, reserved, and booked:

Saved—When the ad network 206 has formed a plan but has not yet presented it to an advertiser 202 for their approval, the plan is "saved". Because a saved plan has not been externally published yet, the network 206 is typically free to alter it as much as they want.

Proposed—Once the ad network 206 presents a plan to an advertiser 202 for their approval, the plan is "proposed". Proposing the plan means that the network 206 gives up much of its flexibility to alter the plan going forward. However, as the plan has not yet been committed to by the advertiser 202, the network 206 does not reserve the inventory the plan uses.

Reserved—Often times, the network 206 has reason to be confident that an advertiser 202 is likely to approve a plan, or at least, a plan very similar to it. In that case, the network 206 can go ahead and reserve the inventory while they wait for approval to be sure that no other plans end up taking those inventory spots.

Booked—Once the advertiser 202 has committed to a plan, it is booked, which means that the plan, in addition to reserving certain spots, is approved to actually play as well.

Typically, when a broadcast station 210 fills up their advertising spots with ad-campaign placements, they quickly run out of space and may not fit additional campaigns into the fragmented bits of inventory remaining. The fragmented bits that remain may not be used because each advertiser 202 prefers to have their campaign to play a substantial amount within specific dayparts. This station 210 level fragmentation loss affects the stations' 210 overall inventory, not just the inventory they have given to ad networks 206, and constitutes one major source of lost value.

By analogy, imagine that a restaurant only received parties of ten to twenty people. Additionally, each party was specific about which parts of the restaurant they were willing to sit in. After a few large parties are seated, the remaining seats will be a patchwork that may not fit any additional parties.

The situation may be worsened for the ad network 206, which represents hundreds to thousands of stations 210. The ad network 206 may attempt to solve an analogous fragmentation puzzle involving the inventory slices from each of its affiliated stations 210. The ad network 206's inventory thus is often 20% to 30% unsold simply because the inventory has been fragmented into an incoherent jumble. When inventory goes unsold, the broadcast media is filled with lower performing filler such as non-profit and/or government messages such as public service announcements that do not contribute substantively towards the station 210, station group 208, and/or network 206.

Currently, ad distribution and delivery in the broadcast industry is "pen and paper" or manually performed, due at least in part to an entrenched history of how it has been done, and due to the heterogeneity of broadcast stations throughout a country. The technologies, process, culture, and business concerns of stations may vary dramatically, necessitating a lowest-common-denominator approach where hundreds of people at the ad network 206 directly interact, via phone or email, with several people at each of the hundreds or thousands of stations 210 that are in the network.

Typically, there is also little to no feedback loop on how well things were actually delivered. As a practical measure, agencies 206 and stations 208, 210 have a "don't ask, don't tell" policy when it comes to delivery problems, despite there being perhaps 20% to 30% under-delivery due to various problems. Examples of delivery problems are the wrong ad played, played at wrong time, or played next to a competitor's ad, or the ad was not played, played too poorly, or played when the broadcasting tower was broken, and so on.

With the complexity of matchmaking exceeding the practical limits of a manual pen-and-paper method, networks 206 typically cope by requiring that advertisers 202 buy a homogenized slice and/or bundle, called a "network minute", across all the stations 210 in their network 206. In this way, the inventory does not get broken up and things do not get complicated. While this does reduce complexity, it adds inefficiency. The advertiser 202 gets little say in who they target (for example, which stations 210) or when they play (for example, which daypart). Thus, using network minute delivery is completely unoptimized to what the advertiser 202 truly would want. As a result, the delivery is correspondingly less valuable to advertiser 202. This in turn lowers advertiser 202 demand, which may lead to waste inventory the network 206 again may not fully sell their inventory. Note that this potential loss due to unsold inventory is a loss in addition to poor matchup due to network-minute selling. That is, because there is no attempt to match the inventory to the detailed desires of the advertiser 202, the total value delivered by the inventory is substantially less than what it could be.

Typically, there are further complications. For example, ads that are placed in the same break may be compatible with each other. For example, two soft drink products from competing brands may not be in the same break. Some advertisers 202 do not want to share a break with what they consider to be a controversial product. Finally, some advertisers 202 do not want to be placed in what they consider to be controversial stations or controversial programs/hosts.

Typically, ad campaigns that last less than a week are rare. Usually they last for several weeks and end up competing for space used by other campaigns, which themselves may extend into a different set of weeks, stations, and dayparts.

Over the course of many months leading up to a particular week, the network 206 progressively learns about each campaign that would like to include that week in their plans.

For each potential campaign, they may first form a proposed campaign plan to present to the advertiser 202. Typically, it may be many weeks before the advertiser 202 commits to the plan. Advertisers 202 often wait to commit until just a week or two before the go-live time, when the week in question starts.

A common issue is answering what the network 206 does with the inventory spots they assigned to the proposed campaign plan before the advertiser 202 commits. If the station 210 reserves that inventory for the advertiser 202, then they may not assign it to other campaigns. Acceptance rates are often as low as 30%, and that means opportunities may be missed. If the network 206 does not reserve a proposed plan's inventory, then other campaigns can be accommodated more flexibly. However, conflicts may occur if two plans eventually try to reserve/book some of the same inventory spots. In fact, if the network 206 does not reserve the inventory, then it is almost guaranteed that by the time the advertiser 202 commits, the network 206 will have to present a slightly revised plan to the advertiser 202 since some of the original plan will be "damaged" by other plans from other advertisers and must be "healed".

Healing is a process of repairing damaged plans by selecting alternative but equivalent placements. Automatic healing may be an important feature to support a frictionless workflow process for a fluctuating inventory pool. Possible use cases include using healing to mitigate inventory changes and/or mitigate lost competition with another plan. Anchored re-planning is a process of creating new plan revisions. Possible use cases include responding to change requests from a buyer, mitigating inventory changes, and/or mitigate lost competition with another plan. Anchored re-planning has at least three modes: a rigid mode allowing only decrements; a rigid mode within a spot's original station, week, and daypart—to allow an incremental spot count; and a "prefer" mode that prefers the original station, week, and daypart—to allow incremental stations.

Traditional Methods. The need to allocate ad plays into a 210 station's inventory spots has been around almost as long as radio has. As mentioned earlier, even today this is almost always done "by hand"/manually, with a highly experienced person determining with pen-and-paper/simple spreadsheets where they can place allocations for a new campaign. A problem is that each campaign has specific and differing placement and sizing requirements from the next campaign. The result is that the campaigns form a patchwork on the 210 stations' inventory that breaks up the inventory into unusable remnants. As mentioned before, in some cases this can lead to 20% to 30% of a 210 station's inventory going unfilled by paying advertisers 202 each week.

Broadcast vs Online Media. Generic scheduling/allocation systems or ad-delivery processes used in mediums other than broadcast are not the same as the broadcast inventory-fill problem. There are several unique characteristics of the broadcast ad distribution problem. In online media (for example browser/websites and/or phone apps), ads are directed at individual people with known demographics. By contrast in broadcast, an ad reaches thousands of people simultaneously (usually publically), creating a demographic pattern of impressions. In online media, the upcoming amount of impressions is not guaranteed because one may not be certain of how many people of each demographic will visit a website or smart-phone app. By contrast in broadcast, the number of impressions is effectively guaranteed because the industry has settled on official estimates of listenership based off of sampling polls.

Figure 4A:
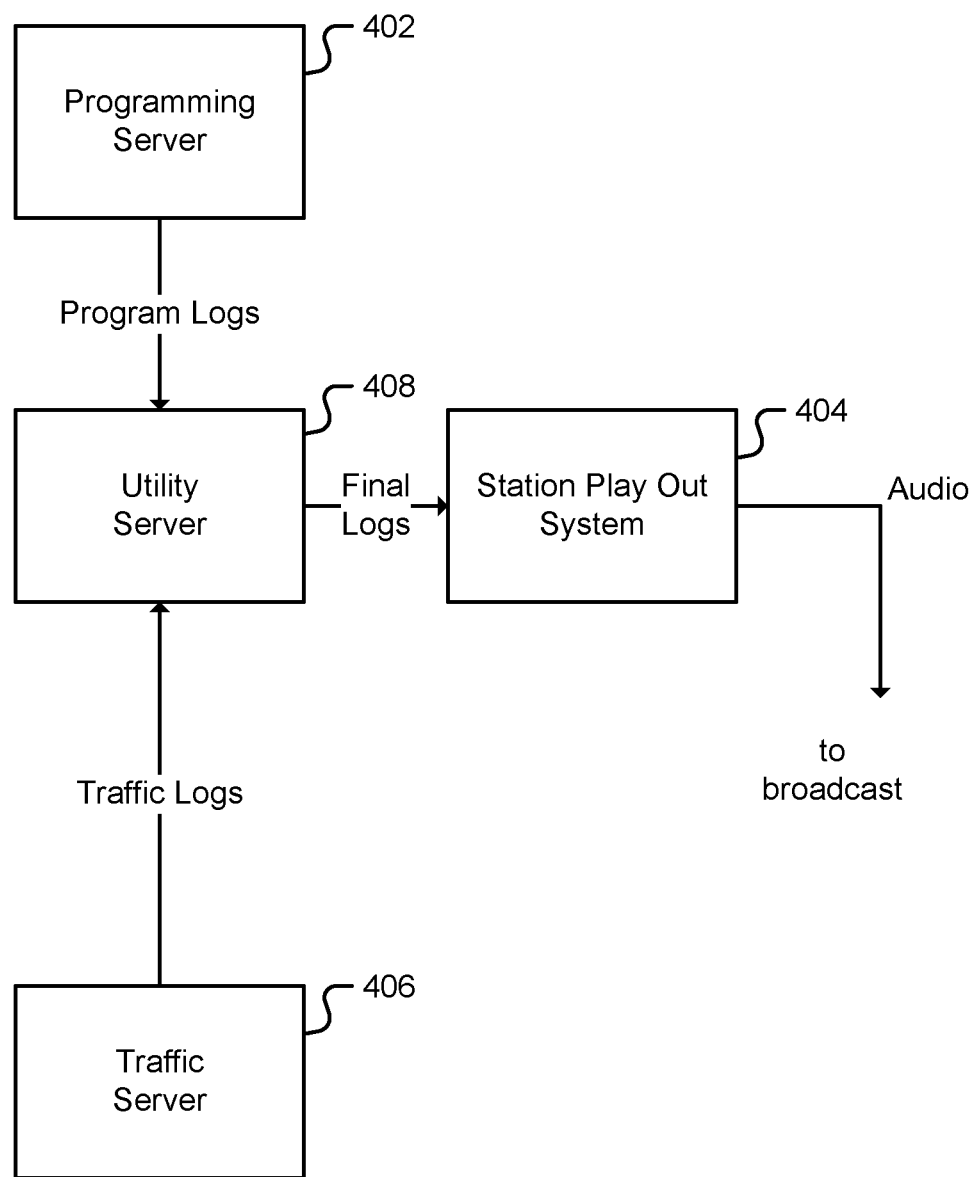
FIG. 4A is a block diagram illustrating a traditional broadcast system.

Sidecar Appliance. FIG. 4A is a block diagram illustrating a traditional broadcast system. The system of FIG. 4A may be at a station 210. In the example shown, 402 is a programming server. Throughout this specification, "programming" refers to core content of the broadcast station, usually content that is more valuable for broadcast consumers, for example listeners or viewers of the broadcast. Throughout this specification, "server" refers without loss of generality to either an internal or external system/platform and may be implemented in software and/or hardware. Thus, a utility server 408 and station play out system 404 may be housed within a single computer as shown in FIG. 1.

A programming server typically has access to pre-recorded or live programming content to be interleaved with traffic and/or ad content. Programming server 402 is coupled with a utility server 408 via program logs, which are generally human-readable files, for example text files, that indicate log book and/or timing details for "carts", which are cartridges and/or unique identifiers for specific creative pieces, including programming, commercials, weather, news, top-of-the-hour announcements, and other programming. For example cart COM-2537 may be a 30-second advertisement for a national home-improvement store with a 10% promotion. Program logs contain information on carts like PRO-1024 which may be a Top 40 popular song that happens to take three minutes and fifty-one seconds. The program logs may also store information for disc jockeys (DJs) such as artist, title, track, rotation, and trivia information about the cart.

Similarly, traffic server 406 provides traffic content. Throughout this specification "traffic" content refers to content other than programming, for example traffic reports, weather reports, local news, FCC mandated spots, such as top-of-the-hour, and local/network/national ad spots. Traffic server 406 is coupled to utility server 408 via traffic logs. Traffic logs contain information on carts like the example of COM-2537 above, or WEA-1100 which may have the eleven o'clock weather report for forty-five seconds.

Utility server 408 provides a merge and/or continuity function to form final logs that are the program logs from programming server 402 and traffic logs from traffic server 406 merged for final play out. The final logs are submitted to station play out system 404, also known as a primary play out system, or an automation system. Without loss of generality, the automation system may include both utility server 408 and play out system 404. The play out system has an audio codec and the capability to directly push content to broadcast.

Typically logs, based on schedulers' log books, are generated a day prior to a broadcast airing and have a predetermined schedule of triggering traffic via the play out systems 404 and 408. This is an issue in that logs are static by being generated so early, and that audio copy may not be changed in real time.

Figure 4B:
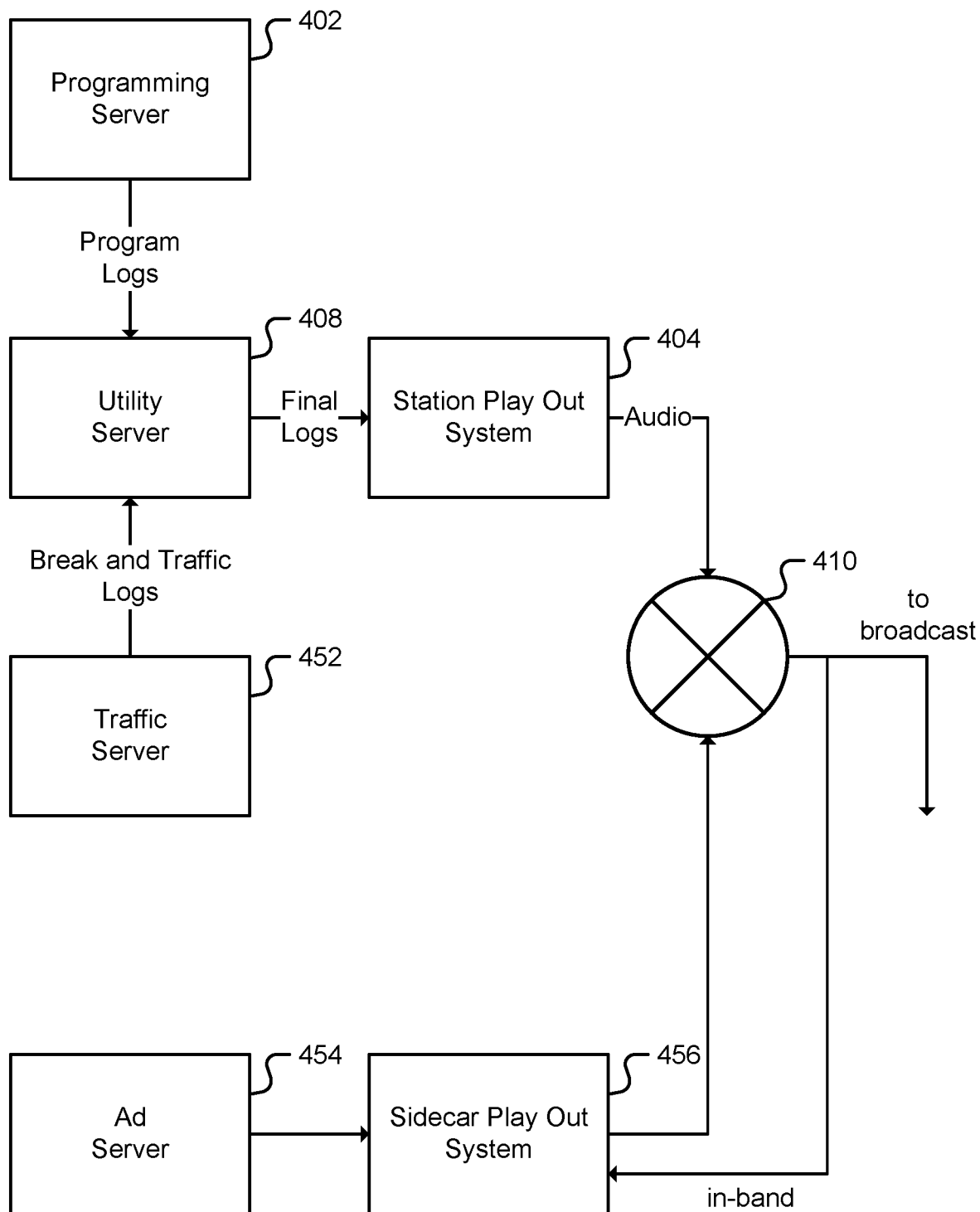
FIG. 4B is a block diagram illustrating an example of a sidecar-appliance broadcast system.

FIG. 4B is a block diagram illustrating an example of a sidecar-appliance broadcast system. The system of FIG. 4B may be at a station 210 affiliated with ad network 206. The sidecar appliance permits ad network 206 to trigger and play spots at station 210 in real time. In the example shown, similar to FIG. 4A, programming server 402 is coupled with station play out system 404 via utility server 408 which is coupled with mixer 410. One traffic server 452 providing, for example, commercial breaks, traffic, and weather reports, is also coupled with station play out system 404 via utility server 408 to provide some but not all of the traffic content for broadcast, and it leaves room for another traffic server using "break" logs. Another traffic server, also known as an ad server 454, is coupled with another second play out system 456. In one embodiment, the ad server 454 is a cloud based platform, wherein cloud refers to cloud computing. Cloud computing refers without loss of generality to the practice of using one or more remote servers hosted on a computer network, for example the Internet, rather than only using local servers and/or local personal computers. Although traffic server 454 is depicted as an ad server, without loss of generality the same in-band trigger techniques may be used for non-advertising content. Because sidecar play out system 456 has its own audio codec, and ad server 454 may be cloud computing based including associated with the internet, it provides a way for media creative to be loaded and scheduled in real time to be merged with the day-old programming logs of a traditional broadcast.

Furthermore, because sidecar play out system 456 can listen to in-band program audio, it can provide real time compliance data to a cloud platform, for example ad server 454. This allows an advertiser 202 or ad agency 204, to verify a creative spot was played in full, what time it was played, when it was played in the logs (for example what program was played prior to the creative spot being played), and the frequency it was played. Sidecar play out system 456 does not need to have an auxiliary network for triggering but may rather directly monitor the output of mixer 410, in-band. When sidecar play out system 456 detects and decodes an in-band trigger, it directly plays content based on instructions and audio copy from ad scheduling server 454 to mixer 410 and out to broadcast.

Improving on the manual process with the sidecar appliance. Thus in one embodiment, a real-time media-delivery sidecar appliance 456 is installed in over a hundred broadcast stations 210. Each broadcast station 210 may then be affiliated with one or more ad networks 206. This allows delivery of a selected ad to the right spot directly into the radio/television broadcast station's broadcast stream at nearly any desired time. Thus, serving ads from the appliance computer permits a near immediate reactiveness to desired additions, changes, and removals in ad campaigns. This level of proactiveness/reactiveness is not at all practical in the "by hand"/manual approach.

That is, even if a network had an army of people transferring existing placements to attempt to fully fill their network, the complexity may boggle the army of people. The constant stream of ad-placement changes would have to be communicated to independent people at hundreds or thousands of radio stations; and not only would these people reject the idea of constantly making adjusts, they would not be able to do so reliably. This hypothetical situation is further exacerbated by the fact that a week's inventory is at its worst gridlock just before the week's go-live time.

Thus, the sidecar appliance 456 allows a fresh solution for the inventory-fill problem at a detailed level that only an automated system/computer can handle, rather than with the traditional broad-stroked methods that a person or persons can realistically apply manually. By computerizing the process, a new tool is forged to dynamically place campaigns' ads in a systemic way that concurrently explores all options and select the best one. The advertising placement system is thus a new problem space for broadcast inventory.

Context in Radio Embodiment. To reiterate, ad networks (206) stand between a large group of radio stations (210) and national advertisers (202). Stations (210) contract out to the ad network (206) some of the space/spots they have available to place ads in, their "inventory". Advertisers (202) and/or their ad agencies (204) approach the ad network (206) asking for their products' ads to play many times across the ad network's stations (210), a "campaign". Planning that campaign requires considering the needs and desires of all three parties: stations (210), ad network (206), and advertiser (202). The planning software must optimize those needs and desires, and where necessary, compromise between them in a balanced way:

The station (210) and ad network (206) want to fully fill the inventory;

The ad network (206) and advertisers (202) want optimized return on investment ("ROI") from their campaigns; and Inventory and campaign delivery/success are measured in terms of impressions.

Impressions are the estimated number of people hearing the ad, given a particular demographic, such as "Men 25-49" or m25-49, "Women 18-24" or w18-24, both of which are subsets of the global demographic "Persons 12 and up", or p12+. One major third-party company providing these measurements is Arbitron, which is currently a part of Nielsen. Stations (210) are typically paid based on the estimated number of listeners in a generic demographic, such as "Persons 18-49" or p18-49. Advertisers (202) typically pay only for the impressions within the demographic they are interested in.

Thus, one of the major functions of an ad network (206) is to place an advertiser's campaign into the stations (210) at parts of the week that are best matched for the campaign's demographic. In other words, the network should optimize what is termed "demo-match" or "demo-matchup".

More sophisticated traditional ad networks may split their ad network (206) into many sub-networks. For example, they may split their network into stations (210) with mostly-male and mostly-female listenership. Some portion of their total inventory is then sold in this more detailed way. This is still not optimal however, because even amongst the mostly-female stations, only a minority of those stations may have good demo-match with "Female 18-25". Moreover, pre-splitting inventory into sub-networks comes with the risk that the corresponding sub-networks won't be sold at the same rate, leaving wasted inventory behind.

Embodiment of Dynamic Lineups. Dynamic lineups are disclosed. In one embodiment, when planning a campaign, each inventory's impressions are measured according to the demographic and daypart of the campaign. This measure is termed the "in-demo impressions", or simply "demo impressions".

In one embodiment, a metric called 'price efficiency' is used to determine ad placement, wherein price efficiency is a ratio of total in-demo impressions per total cost. Maximizing price efficiency alone, however, may yield placement anomalies, for example undercharging early placements, overcharging late placements, evening/weekend daypart emphasis, and imbalance.

In one embodiment, the demo impressions are then compared against the overall-demographic impressions, or just "overall impressions", to calculate the demographic matchup, the "demo-match". The plan is then formed, one ad placement at a time, starting with the inventories that have the highest demo-match. One ad is added at a time because, as the plan is formed, many other criteria are being measured, some examples of which are listed below. A "Judge" is a term for a system which makes the determination in a price efficiency based placement system and/or a demo-match based placement system.

Balancers, distributors, and biasers are used to redistribute price efficiency based placement and/or demo-match based placement. These additional techniques/metrics are combined with the demo-match metric to form an overall fitness metric. The placement with the highest composite fitness is picked.

Some examples of these redistributors include:

market & station distribution—generally, advertisers want their campaign to play in as many markets as possible. For example, as one market becomes more saturated, an additional bias is to keep other markets equally saturated;

inventory rationing—encourages planning to pick stations/markets which have more unused inventory left instead of ones that have little inventory left;

index-impact adjustments—when a plan selects less popular inventory, it improves the overall quality (sometimes termed "index" in radio) of the remaining inventory. The reverse is true as well. This metric accounts for the impact that a placement will have on the index. It can be used to both shape how the plan ends up and/or to adjust the final price of the plan to the agency;

daypart distributor—using a "remnant prorated" method of calculating remnant inventory for a plurality of relevant regions for a campaign, and prorating what is being put into each of the regions, based on the total remnant inventory each region has; and daypart percentage annealing—when a planner selects percentages they prefer in each given region, the sequential process of selecting placements in each region will not result in the selected percentages after each selection, requiring an "annealing" process to grant a dynamic tolerance to avoid the selector from "seizing" at not being able to optimize to the selected percentages; and/or top station biaser—a planner may know in advance that certain stations are of interest to an advertiser regardless of data or quantitative analysis, for example a top station. A biaser may bias a campaign to allow the top station to be placed more often.

Figure 5:
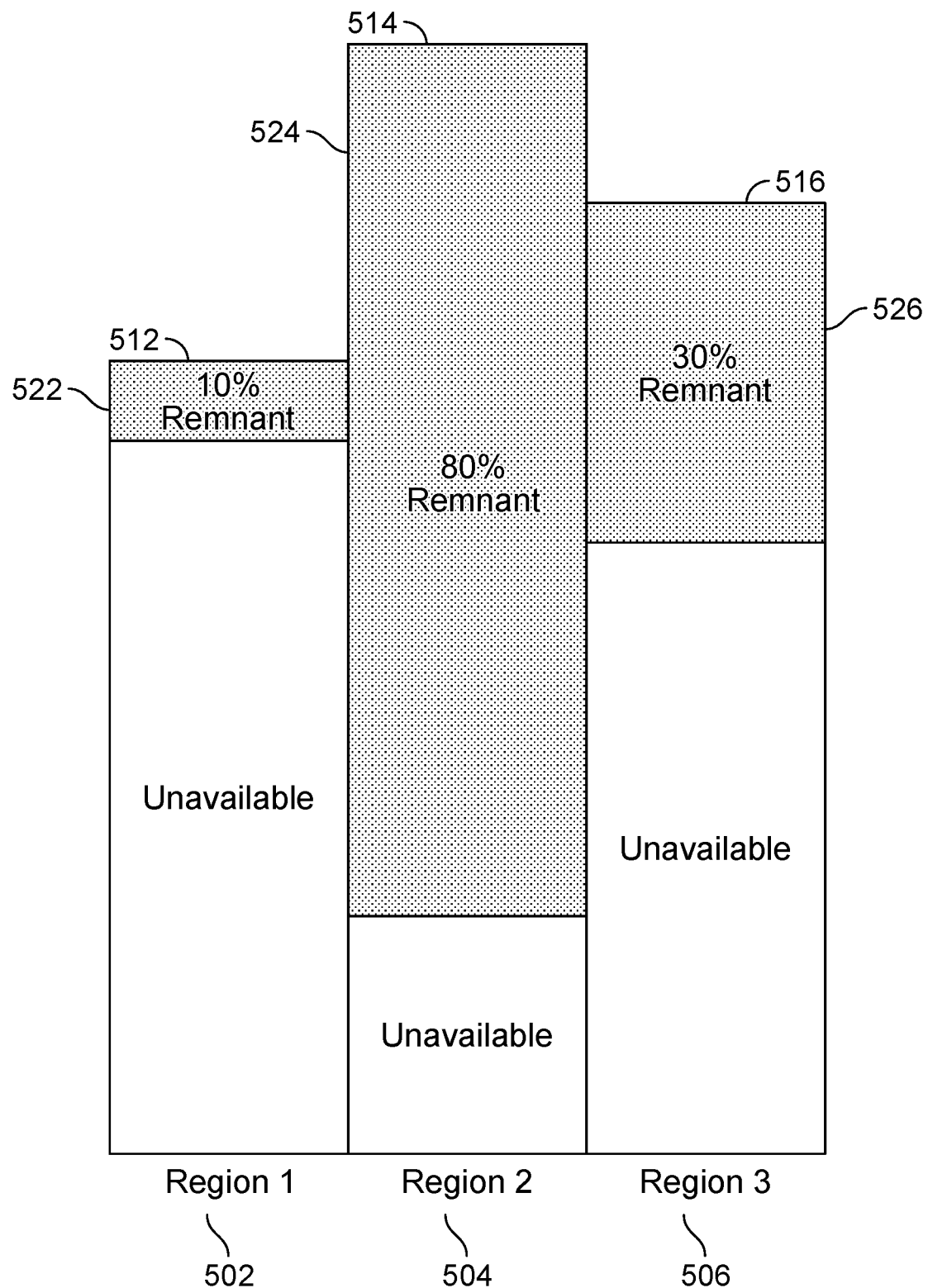
FIG. 5 is an illustration of remnant proration for a daypart distributor.

FIG. 5 is an illustration of remnant proration for a daypart distributor. Three regions are depicted, Region 1 (502), Region 2 (504), and Region (506), shown with a respective total inventory (512), (514), (516), and then a respective remnant inventory (522), (524), (526).

The term 'region' generally refers to a combination of space and time, for example a collection of selected market(s) and/or station(s) 210 and selected week(s) and/or daypart(s) 302. Price may stay the same within a region or between regions, such that without a daypart distributor a Judge may select only one region for placement, say Region 1 (502).

With remnant proration, the percentage of overall remnant available; for example in FIG. 5 10% in Region 1 (522), 80% in Region 2 (524), and 30% in Region 3 (516), is used to prorate what is put into each region, price being equal. Thus with a daypart distributor the Judge would select roughly 10/120 placement in Region 1, 80/120 placement in Region 2, and 30/120 in Region 3. An advantage of a daypart distributor is that it minimizes network fragmentation.

A key issue addressed by the disclosed is that each criteria seems qualitatively different from the rest, meaning there is no apparently natural way to combine them. In one embodiment, transforming and normalizing each metric into financial terms permits combining them in a continuously balanced way into a single fitness metric. This is key to avoiding complex, and often arbitrary, decision logic where "gray zones" are not properly balanced. A common issue with traditional methods, which are often non-mathematically balanced systems, is that they may seem good locally but when combined together they clash and are ineffective.

One example of how the demo-match metric alone might be used to pick one station over another: Consider a campaign that wants the w18-24 demo during the Monday-Friday 5a-8p daypart. Station X gets 1000 impressions per play in that demo and daypart, while getting 2000 impressions in the overall demo, p12+, in the same daypart. Thus, the demo-match is 1000/2000, or 50%. Station Y, on the other hand, gets 600 demo impressions per play and 900 overall impressions. Thus, Station Y's demo-match is 600/900, or 67%. The result is the demo-match algorithm weighs towards picking Station Y instead of Station X, and thus placing the campaign in Station Y is a 34% more efficient use of the inventory.

This level of detailed calculation may be leveraged with automated computer, and/or the complexity and customization that results can be reliably and inexpensively delivered via a direct-to-air appliance and cloud computing infrastructure. Traditional networks typically just allocate a fixed slice of their network's inventory to the campaign regardless of the demo match in each station and daypart.

Dynamic Lineups. A "lineup" is an industry term referring to plays of a campaign that will happen in a given station in a given week. As described above, traditionally a lineup is governed at least in part by a manual and static placement of ads in inventory.

By contrast, lineups and placement as disclosed are "dynamic" in at least two different ways: 1) an initial placement of a campaign is dynamic using the overall fitness metric as described above; and 2) the campaign may be reoptimized/adapted dynamically after initial placement over the lifetime of the campaign with changes in region/demographic placement to react to changes of supply and changes of demand, for example inventory changes, campaign changes, and other new campaigns. Inventory changes may occur for example when a station has equipment failure. The campaign may change, for example, from feedback from a campaign, in some cases programmatically, to increase an ROI for advertiser 202. In one embodiments, a campaign runs during a week along a campaign period of six months to twelve months.

With adaptive planning, a planning algorithm may assume reserved inventory as guaranteed, but remain flexible within its ordered buy specifications. Adaptive/dynamic planning thus allows optimization of yield by reallocating existing placements to achieve higher fill rate or more efficient use of inventory. For example, an AM drive might yield more impressions for a later plan called Plan B: Plan A for Mo-Fr 6a-tp reserved 30 spots evenly spread out (2 per day and AM/Mid/PM), whereas Plan B for Mo-We 6a-10a may force a reallocation of some spots of Plan A from AM into PM.

Benefits. In one embodiment, customized "demo match" greatly expands the effective inventory available to an ad network. Stations are picked with the highest demo match for the campaign, leaving the lower demo-match stations and dayparts aside to be used by other campaigns whose desired demographic matches them. In some cases, the standard pricing in the industry allows perhaps a 10% margin for the network despite the inefficiency of their current practices. In one embodiment, computerized demo matching and campaign scaling allows the network to schedule perhaps 50% more advertising into a week. Since the cost to the network is relatively fixed, the network's margin would increase by 6 times in this hypothetical example.

Demo matching also benefits the business because advertisers prefer when their ads play on stations that naturally attract their targeted demographic.

Figure 6:
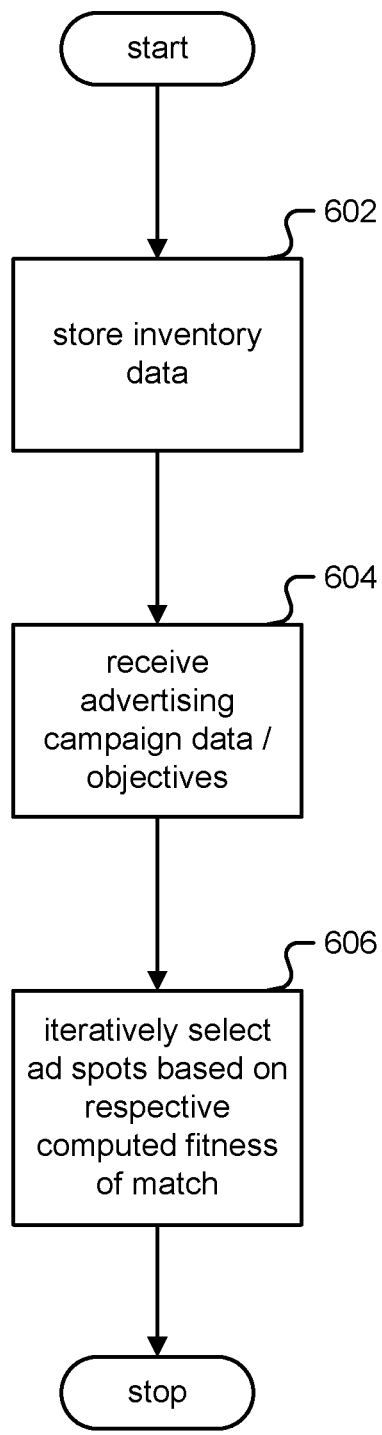
FIG. 6 is an illustration of a flow chart for an dynamic advertising placement.

FIG. 6 is an illustration of a flow chart for an dynamic advertising placement. In step 602, inventory data is stored, wherein the inventory data represents for each of a plurality of broadcast stations 210 a corresponding inventory of audio advertising spots available from that broadcast station 210 to be filled by an advertising placement system. In one embodiment the advertising placement system is run at a programmatic ad network 206 as shown in FIG. 2.

In step 604, an advertising campaign data is received from advertiser 202 and/or ad agency 204, wherein the advertising campaign data represents a set of advertising objectives of an advertising campaign.

In step 606, the inventory data is used to iteratively select advertising spots to be associated with the advertising campaign, based at least in part on a respective computed fitness of match between each selected advertising spot and said advertising objectives. In one embodiment the computed fitness of match comprises a primary metric comprising at least one of a demo-match metric and a price efficiency metric. In one embodiment, the computed fitness of match comprises the primary metric and a secondary metrics. In one embodiment, a secondary metric is transformed to a normalized value, for example a value normalized into financial terms such as price, cost, ROI, and so on. In one embodiment, a normalization strategy includes normalizing them all into financial terms so they can be combined together in a meaningful way to get the overall fitness. In one embodiment, the price efficiency metric is evaluated by efficiency in demo impressions for a given amount of money. In one embodiment, being evaluated by efficiency also comprises a bias to achieve a daypart distribution, for example the bias is remnant prorated. In one embodiment, being evaluated by efficiency also comprises an overall fitness including price efficiency and region distribution fitness.

In an additional step (not shown in FIG. 6) advertising spots are dynamically re-selected to be associated with the advertising campaign based at least in part on one or more of the following: a change in inventory and/or a subsequently processed campaign; recomputing the respective computed fitness of match, including at least one of: recomputing aggregated fitness and recomputing overall fitness; and to attain a same or equivalent fitness of match.

In an additional step (not shown in FIG. 6) the advertising campaign is globally optimized with a second advertising campaign. Such a globally optimization comprises at least one of: optimizing at least one of a supply side and a demand side across both advertising campaigns; achieving objectives of both advertising campaigns collectively with a maximum fill of ad spots; and/or achieving objectives of both advertising campaigns collectively with a maximum ROI to the plurality of broadcast stations.

As described above, the technique in FIG. 6 may be carried out by a computer as shown in FIG. 1 coupled by a network connection to a plurality of sidecar appliances 456 in each of the plurality of broadcast stations 210.

Figure 7:
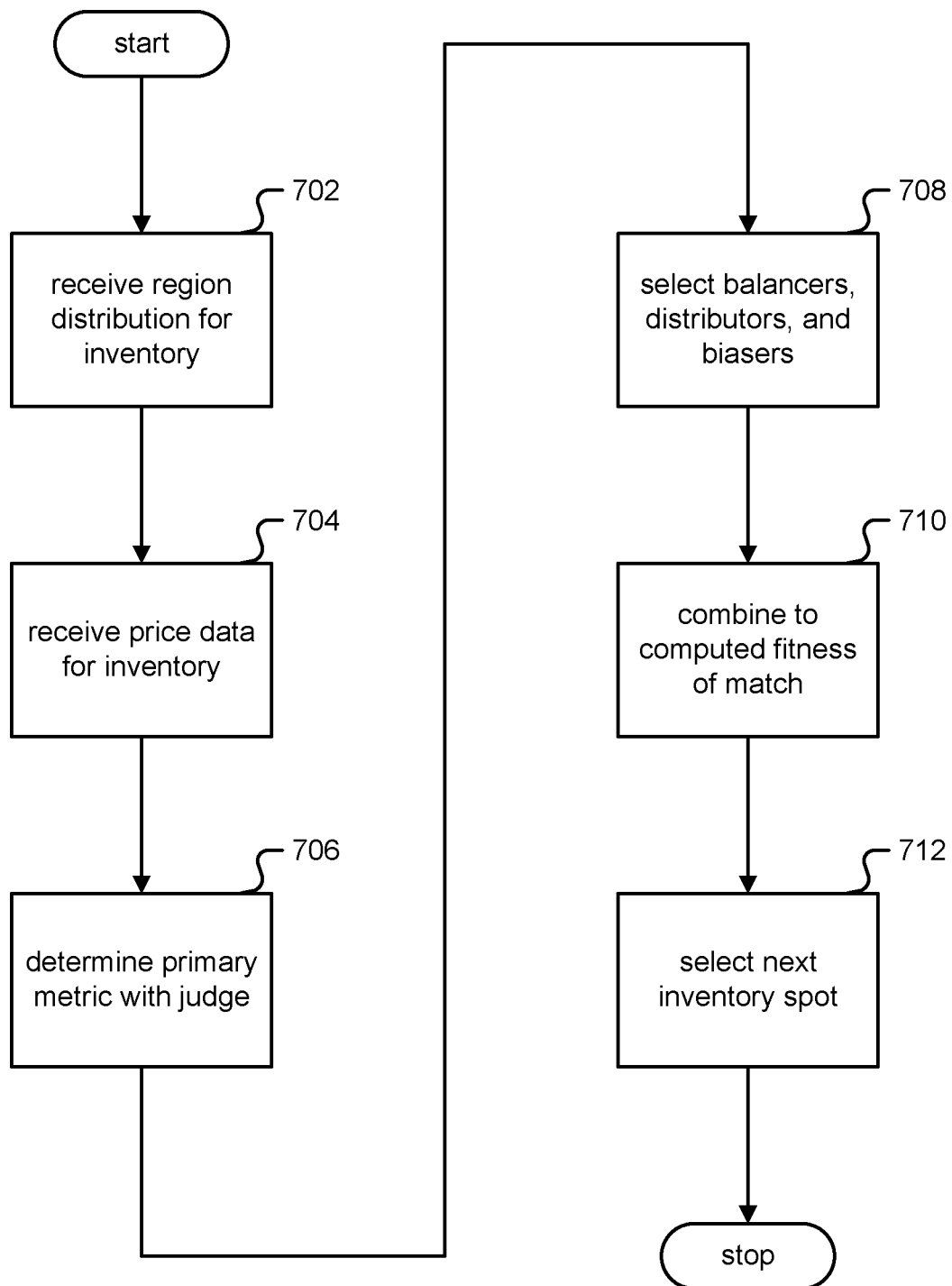
FIG. 7 is an illustration of a flow chart for selection of advertising spots.

FIG. 7 is an illustration of a flow chart for selection of advertising spots. In one embodiment, the process of FIG. 7 is part of step 606 in FIG. 6.

In steps 702 and 704, a region distribution for a campaign is received along with its corresponding price data. In step 706, a primary metric is determined for the campaign using a judge. A judge measures at least one fitness component. In one embodiment, a programmatic analysis of the campaign and/or user preferences determines whether the primary metric is price efficiency or demo-match. Price data may include CPM (cost per thousand impressions), payout AQH (average quarter-hour persons), and/or spot price. In steps 702 and 704, other determinants in inventory may also be input, including break length, break counts and:

Base input:
a. inventory pool selection
b. advertiser
Exclusions input:
a. market
b. format
c. station
d. other tags (e.g. controversial)
Ratings
a. data set (e.g. Nielsen book)
b. demographic
Multi config
a. flight weeks
b. dayparts
c. spot length
d. reach goal (Impressions or GRPS)
e. rate limit (CPM or CPP)
f. budget limit
g. target weighting for markets, formats, stations, station ranks,
h. demographics, household (income, size, education, children), flight weeks In step 708, balancers, distributors, and/or biasers are selected if any to affect failings or other challenges in using the primary metric alone for a campaign. In one embodiment, one or more judges are used, each measuring a fitness component. In one embodiment, balancers are elements that try to even out or balance different aspects of placement; distributors are elements that allow proration or redistribute placement; and biasers are elements that intentionally skew placement for quantitative or qualitative rationale. In one embodiment the balancers, distributors, and/or biasers are selected programmatically based on the campaign and/or user preferences.

In step 710, the primary metric and any balancers, distributors and/or biases are combined to compute a fitness of match. Combination may be a weighted function, for example a weighted sum of the normalized factors. Normalization to financial terms may be performed to provide a continuously balanced way to a single fitness metric. In one embodiment, there are multiple judges whose fitness calculations are combined to give the overall fitness in a selection phase. Once the overall fitness for each open spot is calculated, the best one is selected and then the overall fitnesses are recalculated again, for example for the new matches given of occupied spots.

In step 712, a selection phase is used to select the next inventory spot using the combined fitness of match metric.

In one embodiment, plan pricing includes the "natural price" of a plan as the sum of prices of its placements. The "proposal price" of a plan is the natural price adjusted by index factors that represent pool fragmentation:

$$\text{Price(plan)} = [\Sigma_{placement} \text{ Price(placement)}] \times \Pi_{index} \text{ factor}_{index} \frac{\text{index(plan)}}{\text{index(pool)}}$$

Index factors may be freely defined and may represent resources that positively impact pricing of the inventory pool, for example Top-10 markets, Top-5 stations. In one embodiment, there are different pricing options. The first is "cost based pricing" to support elastic pricing to achieve target margins based on a variable inventory cost structure. The price for an individual placement may be a function of the inventory cost multiplied with the configured target margin:

Price(placement)=[1+margin(tier,week,daypart)]× Cost(placement)

Thus, more expensive inventory in a pool may automatically increase plan prices and vice versa; changes to the effective pricing may be automatic.

A second may be "normalized impression-based pricing" to support controlled pricing for a buyer decoupled from cost structure. The price of an individual placement may be a function of its normalized impression multiplied with a configured eCPM (effective CPM):

$$\text{Price}(\text{placement}) = eCPM(\text{tier, week, daypart}) \times \frac{Imps_{normalized}(\text{placement})}{1000}$$

Target margins may be managed externally. Thus buyers may experience stable pricing, and changes to the effective pricing may become a yield management function.

For both pricing options, yield management has fine control over pricing through for example a three-dimensional matrix:

a. Cost-based option: Target margin per (tier x week x daypart)

b. Normalized impression-based option: eCPM per (tier x week x daypart)

Summary Matching campaigns to stations is one of the primary jobs, if not the primary job, of an ad network. However, because of the manual nature of traditional matching, the prevailing standard among ad networks is to simply sell "network minutes", meaning that an advertiser is only allowed to buy an even slice and/or bundle across the entire network, with no station or daypart customization done to match the desired demographic or other goals of the advertiser.

Despite its drawbacks, the network-minute model prevails simply because it requires substantially more effort to process in a more sophisticated way. Much more sophistication, and the process is beyond what a human being, and especially a huge distributed network of human beings, can reliably calculate or execute manually.

Thus, the algorithms disclosed are developed to support processes needed to produce completely detailed customization of campaign plans across a full ad network of hundreds to thousands of stations. Moreover, the processes developed herein are not simply a scaling up of the more holistic, intuitive reasoning that a human being might apply to the problem; instead, the processes disclosed are logically sound and tailored to the procedural and concurrent nature of computers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory configured to store inventory data representing an inventory of audio advertising spots available from a first broadcast station; and
   a network interface coupled to the memory and a processor, wherein:
   the network interface is coupled to a first in-band play out appliance associated with the first broadcast station;
   the first in-band play out appliance is directly coupled to a first broadcast station mixer output of the first broadcast station; and
   the first in-band play out appliance is directly coupled to a first broadcast station mixer input at least in part using an in-band play out appliance audio codec; and
   a processor coupled to the memory and configured to:
   receive an advertising campaign data representing a set of advertising objectives of an advertising campaign comprising a demographic measurement from a third-party data source;
   use the inventory data to iteratively select advertising spots at the first broadcast station to be associated with the advertising campaign, based at least in part on a respective computed fitness of match between each selected advertising spot and said advertising objectives; and
   merge said selected advertising spots in real time with previously programmed logs of a first station play out system directly coupled to the first broadcast station mixer input using the first in-band play out appliance.

2. The system recited in claim 1, wherein the computed fitness of match comprises a primary metric comprising at least one of a demo-match metric and a price efficiency metric.

3. The system recited in claim 2, wherein the computed fitness of match comprises the primary metric and a secondary metric.

4. The system recited in claim 3, wherein the secondary metric is transformed to a normalized value.

5. The system recited in claim 4, wherein the price efficiency metric is evaluated by efficiency in demo impressions for a given amount of money.

6. The system recited in claim 5, wherein evaluated by efficiency also comprises a bias to achieve a daypart distribution.

7. The system recited in claim 6, wherein the bias is remnant prorated.

8. The system recited in claim 5, wherein evaluated by efficiency also comprises an overall fitness including price efficiency and region distribution fitness.

9. The system recited in claim 1, wherein the processor is further configured to: dynamically reselect advertising spots to be associated with the advertising campaign based at least in part on a change in inventory.

10. The system recited in claim 1, wherein the processor is further configured to: dynamically reselect advertising spots to be associated with the advertising campaign based at least in part on a subsequently processed campaign.

11. The system recited in claim 1, wherein the processor is further configured to: dynamically reselect advertising spots to be associated with the advertising campaign based at least in part on recomputing the respective computed fitness of match.

12. The system recited in claim 11, wherein recomputing comprises at least one of: recomputing aggregated fitness and recomputing overall fitness.

13. The system recited in claim 1, wherein the processor is further configured to: dynamically reselect advertising spots to be associated with the advertising campaign based at least in part to attain a same or equivalent fitness of match.

14. The system recited in claim 1, wherein the processor is further configured to: globally optimize the advertising campaign with a second advertising campaign.

15. The system recited in claim 14, wherein globally optimize comprises optimizing at least one of a supply side and a demand side across both advertising campaigns.

16. The system recited in claim 14, wherein globally optimize comprises achieving objectives of both advertising campaigns collectively with a maximum fill of ad spots.

17. The system recited in claim 14, wherein globally optimize comprises achieving objectives of both advertising campaigns collectively with a maximum ROI to the plurality of broadcast stations.

18. The system recited in claim 1, further comprising a plurality of sidecar appliances in each of the plurality of broadcast stations, wherein the plurality of sidecar appliances are coupled to the memory and the processor by a network connection.

19. A method, comprising:
  storing inventory data, wherein the inventory data represents an inventory of audio advertising spots available from a first broadcast station; and
  receiving an advertising campaign data representing a set of advertising objectives of an advertising campaign comprising a demographic measurement from a third-party data source;
  using the inventory data to iteratively select advertising spots at the first broadcast station to be associated with the advertising campaign, based at least in part on a respective computed fitness of match between each selected advertising spot and said advertising objectives; and
  merging said selected advertising spots in real time with previously programmed logs of a first station play out system directly coupled to a first broadcast station mixer input using a first in-band play out appliance.

20. A computer program product, the computer program product being embodied in a non-transitory computer readable storage medium and comprising computer instructions for:
  storing inventory data, wherein the inventory data represents an inventory of audio advertising spots available from a first broadcast station; and
  receiving an advertising campaign data representing a set of advertising objectives of an advertising campaign comprising a demographic measurement from a third-party data source;
  using the inventory data to iteratively select advertising spots at the first broadcast station to be associated with the advertising campaign, based at least in part on a respective computed fitness of match between each selected advertising spot and said advertising objectives; and
  merging said selected advertising spots in real time with previously programmed logs of a first station play out system directly coupled to a first broadcast station mixer input using a first in-band play out appliance.

* * * * *